United States Patent
Hamilton et al.

(10) Patent No.: US 11,165,282 B2
(45) Date of Patent: Nov. 2, 2021

(54) MODULE FOR INDUCTIVE ENERGY TRANSFER

(71) Applicant: BRUSA Elektronik AG, Sennwald (CH)

(72) Inventors: Martin Hamilton, Sennwald (CH); Lukas Böhler, Wangs (CH)

(73) Assignee: BRUSA Elektronik AG, Sennwald (CH)

( * ) Notice: Subject to any disclaimer, the term of this patent is extended or adjusted under 35 U.S.C. 154(b) by 209 days.

(21) Appl. No.: 16/453,485

(22) Filed: Jun. 26, 2019

(65) Prior Publication Data

US 2020/0006985 A1 Jan. 2, 2020

(30) Foreign Application Priority Data

Jun. 29, 2018 (DE) ...................... 10 2018 115 837.8

(51) Int. Cl.
*H02J 50/12* (2016.01)
*B60L 53/30* (2019.01)
(Continued)

(52) U.S. Cl.
CPC .............. *H02J 50/12* (2016.02); *B60L 53/12* (2019.02); *B60L 53/30* (2019.02); *H02J 7/025* (2013.01)

(58) Field of Classification Search
USPC ........................................................ 320/108
See application file for complete search history.

(56) References Cited

U.S. PATENT DOCUMENTS 8,482,158 B2 7/2013 Kurs et al.
10,245,963 B2 4/2019 Ansari et al.
(Continued)

FOREIGN PATENT DOCUMENTS

DE 10 2017 214 804 A1 6/2018
JP 5293851 B2 9/2013

*Primary Examiner* — Bryce M Aisaka
(74) *Attorney, Agent, or Firm* — Hoffmann & Baron, LLP

(57) ABSTRACT

A module for inductive energy transfer, including: a main coil HS enclosed by insulation IS1, with electrical connections $A1_{HS}$ and $A2_{HS}$ routed from/to coil HS by insulation IS1; and an assembly with high-voltage parts HT1 and HT2, and a low-voltage part NT, part HT1 enclosed by insulation $IS2_{HT1}$ and part HT2 enclosed by insulation $IS2_{HT1}$ separate from insulation $IS2_{HT2}$, a connection $A1_{HT}$ routed to a first connection of coil HS, a first electrical supply routed from part NT to part HT1 by insulation $IS2_{HT1}$, a connection $A2_{HT}$ routed to a second connection of coil HS, and a second electrical supply routed from part NT to part HT2 by insulation $IS2_{HT2}$, wherein connections $A1_{HS}$-$A1_{HT}$ are electrically connected and enclosed by insulation $IS3_{A1}$ that is in contact with insulations IS1 and $IS2_{HT1}$, and connections $A2_{HS}$-$A2_{HT}$ are electrically connected and enclosed by insulation $IS3_{A2}$ that is in contact with insulations IS1 and $IS2_{HT2}$.

21 Claims, 1 Drawing Sheet

(51) Int. Cl.
*B60L 53/12* (2019.01)
*H02J 7/02* (2016.01)

(56) References Cited

U.S. PATENT DOCUMENTS

| | | | |
|---|---|---|---|
| 2009/0289754 A1* | 11/2009 | Shpiro | H01F 17/062 336/84 C |
| 2018/0109292 A1* | 4/2018 | Lee | H04B 5/0037 |
| 2018/0219334 A1* | 8/2018 | Kahlman | G06F 13/4063 |

* cited by examiner

MODULE FOR INDUCTIVE ENERGY TRANSFER

CROSS-REFERENCE TO RELATED APPLICATIONS

This application claims benefit of German Patent Application No. 10 2018 115 837.8, filed on 29 Jun. 2018, the contents of which are incorporated herein by reference in their entirety.

BACKGROUND

Field

The invention relates to a module for inductive energy transfer, a ground module GPM for a vehicle charging system for charging an energy storage device on a vehicle with such a module, a vehicle module CPM for a vehicle charging system for charging an energy storage device on a vehicle with such a module, a charging system for a vehicle for charging an energy storage device on the vehicle with such a module, as well as a vehicle, aircraft, watercraft, railway vehicle with such a module.

Related Art

Inductive charging devices for wireless charging of an energy storage device on the vehicle transfer electrical energy, typically via a resonant magnetic field, wirelessly from a primary unit (GPM or Ground Pad Module), which is typically arranged on the ground with motor vehicles, to a secondary unit on the vehicle (CPM or Car Pad Module).

In order to establish the resonant magnetic field and/or to transfer energy via the magnetic field, both the primary unit (GPM) and the secondary unit (CPM) contain main coils, each of which is connected to an electrical resonance circuit. In doing so, there are very high voltages, for example of from 5000 V to 7000 V, present at the electrical connections for the respective main coils.

In order to fulfill the applicable safety regulations with respect to creepage distances, the insulation of the electrical main coil connections to ground must therefore be executed with very long creepage distances (in the range of several meters). Because the actual distances between components conducting high-voltage in inductive charging devices and grounded components are only within a range of a few centimeters, however, such long creepage distances disadvantageously lead to a great amount of design complexity.

The term creepage distance here is understood to be the shortest distance between two conductive parts along a surface of a solid insulating material. The term creepage current here is understood to be leakage current which flows along the surface of an insulating material.

SUMMARY

The object of the invention is to provide a module for inductive energy transfer, which enables a compact design.

The invention results from the features of the main claims. Advantageous further embodiments and designs are the subject matter of the dependent claims. Further features, application options, and advantages of the invention result from the following description, and explanation, of example embodiments of the invention, which are represented in the figures.

A first aspect of the invention relates to a module for inductive energy transfer including the following: a main coil HS, which is completely enclosed by electrical insulation IS1, wherein only two connections, $A1_{HS}$ and $A2_{1E}$, are routed from/to the main coil HS by insulation IS1; an electrical assembly with two high-voltage parts, HT1 and HT2, and at least one low-voltage part NT, wherein each of the high-voltage parts, HT1 and HT2, is directly and completely enclosed by separate electrical insulation, $IS2_{HT1}$ and $IS2_{HT2}$, wherein connection $A1_{HT}$ is routed to a first connection of the main coil HS, and a first electrical supply line is routed from the low-voltage part NT to the high-voltage part HT1 by insulation $IS2_{HT1}$ and wherein connection $A2_{HT}$ is routed to a second connection of the main coil HS, and a second electrical supply line is routed from the low-voltage part NT to the high-voltage part HT2 by insulation $IS2_{HT2}$, and connection $A1_{HS}$ is only electrically connectable to connection $A1_{HT}$ such that connections $A1_{HS}$-$A1_{HT}$, which are electrically connected to one another, are each directly and completely enclosed by electrical insulation $IS3_{A1}$, which is in direct contact with insulation IS1 and insulation $IS2_{HT1}$, and connection $A2_{HS}$ is only electrically connectable to connection $A2_{HT}$ such that connections $A2_{HS}$-$A2_{HT}$, which are electrically connected to one another, are directly and completely enclosed by electrical insulation $IS3_{A2}$, which is in direct contact with insulation IS1 and insulation $IS2_{HT2}$.

The terms first connection and second connection of the main coil HS characterize the two connections $A1_{HS}$ and $A2_{HS}$ of the main coil HS or specifically the main coil winding.

The proposed module effectively prevents leakage currents by use of the indicated electrical insulation such that the module can be produced very compactly, wherein, however, the corresponding safety regulations can be adhered to with respect to the electrical insulation and creepage currents.

The main coil HS is advantageously designed as a flat coil. Electrical insulation IS1 of the main coil HS may consist particularly of a housing made of an electrically insulating material, into which the main coil HS is integrated. The housing is advantageously designed such that the windings of the main coil HS are routed within the housing. Advantageously, electrical insulation IS1 exclusively encloses the main coil HS including the two connections $A1_{HS}$ and $A2_{HS}$, which penetrate through insulation IS1 to the outside. The main coil can also be cast into insulation IS1.

Electrical insulation IS1 and/or $IS2_{HT1}$ and/or $IS2_{HT2}$ and/or $IS3_{A1}$ and/or $IS3_{A2}$ advantageously consist of a plastic material, particularly of a hydrophobic plastic material or of a ceramic material (e.g., steatite or porcelain).

The two electrical connections $A1_{HS}$ and $A2_{HS}$ may be designed as plug-in connections, terminal connections, or the like, wherein electrical connections $A1_{HS}$ and $A2_{HS}$ are connected directly to respective ends of the main coil HS.

The proposed module further includes the electrical assembly with the two connections HT1 and HT2 and at least one low-voltage part NT. One of the high-voltage parts HT1 and HT2 or one of their connections are assigned to each connection $A1_{HS}$ and $A2_{HS}$ of the main coil HS, i.e., the following assignment of electrical connections applies for example: $A1_{HS}$-$A1_{HT}$ and $A2_{HS}$-$A2_{HT}$.

The two electrical connections $A1_{HT}$ and $A2_{HT}$ are advantageously designed so as to complement electrical connections $A1_{HS}$ and $A2_{HS}$. Advantageously, connections $A1_{HS}$-$A1_{HT}$ and $A2_{HS}$-$A2_{HT}$ are designed as plugs and sockets.

The main coil HS with the insulation IS1 and connections $A1_{HS}$ and $A2_{HS}$ is advantageously designed as a component separate from the electrical assembly. This enables simple production as well as the possibility of an easy replacement of the main coil HS. The electrical assembly is advantageously implemented on a PC board.

Electrical connections $A1_{HS}$-$A1_{HT}$ and $A2_{HS}$-$A2_{HT}$, which are designed as plugs and sockets, are advantageously arranged essentially perpendicular to a PC board, on which the electrical assembly is arranged, and parallel to one another, whereby a compact design of the module with simultaneous simple assembly is enabled, because the plug-in connection of the two electrical connections can be produced by a simple linear plug-in movement of an entire preassembled assembly consisting of the insulation IS1 and the main coil HS and, in this process, a flatly built overall construction results.

In order to prevent lateral forces, the passages of the two connections $A1_{HS}$ and $A2_{HS}$ (formed as plugs) are advantageously designed by use of the insulation IS1 such that a certain mobility of the two plugs is enabled with respect to their linear distance (distance between their two center axes). This prevents lateral forces, for example, due to production tolerances or thermal expansions causing different distances between the two sockets and the two plugs. Advantageously, electrical insulation $IS3_{A1}$ and $IS3_{A2}$ as well as the respective connection points between insulation IS1, $IS3_{A1}$, $IS3a2$, $IS2_{HT1}$, and $IS2_{HT2}$ are also respectively designed such that the aforementioned mobility of the two plugs is enabled.

In this case, the low-voltage part NT and high-voltage parts HT1 and HT2 are advantageously defined as follows. With the low-voltage part NT, the electrical (alternating) voltages during operation are advantageously in a range from 0 V to 1000 V, or 0 V to 900, or 0 V to 800 V, or 0 V to 700 V, or 0 V to 600 V, or 0 V to 500 V, or 0 V to 400 V, or 0 V to 300 V. With the high-voltage parts HT1 and HT2, the electrical (alternating) voltages during operation are advantageously greater than 1000 V, or greater than 1500 V, or greater than 2000 V, or greater than 3000 V, or greater than 4000 V, or greater than 5000 V, or greater than 6000 V, or greater than 7000 V, or are in a range from 1000 V to 9000 V.

Advantageously, insulation $IS3_{A1}$ and/or $IS3_{A2}$ is a component of insulation IS1. Alternatively, insulation $IS3_{A1}$ may be a component of insulation $IS2_{HT1}$ and/or insulation $IS3_{A2}$ may be a component of insulation $IS2_{HT2}$. Advantageously, insulation $IS3_{A1}$ and/or $IS3_{A2}$ and/or IS1 and/or $IS2_{HT1}$ and/or $IS2_{HT2}$ are formed from the same electrically insulating material. Advantageously, insulation $IS3_{A1}$ and $IS3_{A2}$ are formed from a different material than insulation IS1 and/or $IS2_{HT1}$ and/or $IS2_{HT2}$.

Insulation $IS2_{HT1}$ and $IS2_{HT2}$ are advantageously placed onto high-voltage parts HT1/HT2 in a flowable state of the respective electrically insulating material.

An advantageous further embodiment of the proposed module is characterized in that an array of capacitors and/or coils is arranged as electrical components in high-voltage parts HT1 and HT2. Advantageously, these electrical components are arranged in respective high-voltage parts HT1 and HT2 such that a voltage generated/processed by the electrical components increases in one direction via the respective (total) high-voltage part HT1/HT2. Advantageously, the direction of increase of the voltage extends over the respective high-voltage part HT1/HT2 essentially from a position of the respective inlet of the electrical supply lines, coming from the low-voltage part NT, to a position of respective connection $A1_{HT}$/$A2_{HT}$ with respect to the main coil.

Advantageously, each of the high-voltage parts HT1 and HT2 includes a square or rectangular array of capacitors and/or coils, which are arranged on a PC board. On a first side, the array of the high-voltage part HT1, for example, is electrically connected to the low-voltage part NT on the input side. On the side of the array opposite the first side, the array is connected, on the output side, to connection $A1_{HT}$, which serves as the one-sided connection of the main coil HS. The arrangement of the capacitors/coils and their circuitry then advantageously takes place in that the voltage processed by the capacitors/coils increases from the first side to the opposite side. The operating voltage thus increases over the array from the first side to the opposite side.

Due to the proposed insulation concept, all of the high-voltage-conducting parts of the module (main coil HS as well as high-voltage parts HT1 and HT2 and connected connections $A1_{HS}$-$A1_{HT}$ and $A2_{HS}$-$A2_{HT}$) are completely enclosed by insulation IS1, $IS2_{HT2}$, $IS3_{A2}$, and $IS3_{A2}$ in the operating state such that no creepage currents can form. Thus, high-voltage-conducting parts and low-voltage-conducting parts can be implemented next to one another in a compact space. The proposed module can thereby be produced in a space-saving and material-saving manner and fulfils so-to-speak the necessary requirements regarding creepage current resistance.

A further aspect of the invention relates to a ground module GPM for a vehicle charging system for charging an energy storage device on the vehicle, wherein the vehicle charging system includes the ground module GPM and a vehicle module CPM, the vehicle module CPM arranged on the vehicle, wherein energy from the ground module GPM is transferred inductively to the vehicle module CPM, and wherein the ground module GPM has a module, as previously described.

A further aspect of the invention relates to a vehicle module CPM for a vehicle charging system for charging an energy storage device on the vehicle, wherein the vehicle charging system includes a ground module GPM and a vehicle module CPM, the vehicle module CPM arranged on the vehicle, wherein energy from the ground module GPM is transferred inductively to the vehicle module CPM, and wherein the vehicle module CPM has a module, as previously described.

A further aspect of the invention relates to a charging system for a vehicle for inductive charging of an energy storage device on the vehicle, including a ground module GPM and a vehicle module CPM, the vehicle module CPM arranged on the vehicle, wherein energy from the ground module GPM is transferred inductively to the vehicle module CPM, and wherein the ground module GPM and/or the vehicle module CPM has a module, as previously described.

A final aspect of the invention relates to a vehicle, particularly a land-based vehicle, an aircraft, watercraft, or a railway vehicle with a module, as previously described.

Other advantages, features, and details result from the following description, in which at least one example embodiment is described in detail—optionally with reference to the drawings. Equivalent, similar, and/or functionally equivalent parts have been given the same reference numbers.

DETAILED DESCRIPTION

Figure 1:
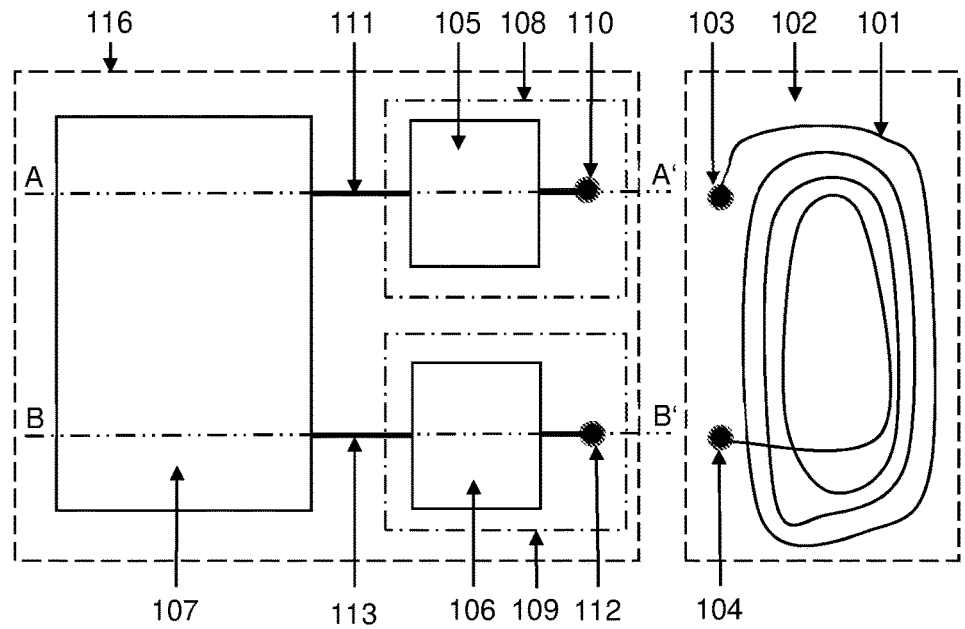
FIG. 1 shows a top view of a diagram representation of a module according to the invention with a still separated main coil HS and of a low-voltage part NT and two high-voltage parts HT1 and HT2 arranged on a plate 116.

FIG. 1 shows a top view of a diagram representation of a module according to the invention for inductive energy transfer with a (still separated) main coil HS and with an electrical assembly, including a low-voltage part NT 107 and two high-voltage parts HT1 105 and HT2 106, arranged on an electrically insulating plate 116.

The board 116 is advantageously designed as a PC board.

The main coil HS 101 is designed as a flat coil and completely enclosed by electrical insulation IS1 102 including a plastic material. Only two connections $A1_{HS}$ 103 and $A2_{HS}$ 104 are routed from/to the main coil HS 101 by insulation IS1 102. Connections $A1_{HS}$ 103 and $A2_{HS}$ 104 in this case are designed as a plug of a plug-in connection.

The electrical assembly, with the two high-voltage parts HT1 105 and HT2 106 and one low-voltage part NT 107, is arranged on the electrically insulating plate 116. Each of the high-voltage parts HT1 105 and HT2 106 is directly and completely enclosed by respective separate electrical insulation $IS2_{HT1}$ 108 or $IS2_{HT2}$ 109, respectively, wherein an electrical connection $A1_{HT}$ 110 is routed to a first electrical connection of the main coil HS 101, e.g., electrical connection $A1_{HS}$, and at least one electrical supply line 111 is routed from the low-voltage part NT 107 to the high-voltage part HT1 105 by insulation $IS2_{HT1}$ 108, and wherein an electrical connection $A2_{HT}$ 112 is routed to a second electrical connection of the main coil HS 101, e.g., electrical connection $A2_{HS}$, and at least one electrical supply line 113 is routed from the low-voltage part NT 107 to the high-voltage part HT2 106 by insulation $IS2_{HT2}$ 109. Electrical connections $A1_{HT}$ 110 and $A2_{HT}$ 112 here are designed as sockets for incorporating connections $A1_{HS}$ 103 and $A2_{HS}$ 104 designed as plugs, thus forming a fixed electrical connections.

Specifically, this means that the electronic components, which are arranged on the non-electrically conductive plate 116, of high-voltage parts HT1 105 and HT2 106 may be correspondingly electrically connected within the respective high-voltage parts HT1 105 and HT2 106, but any available surfaces of the electronic components, the non-conductive plate 116, and the connection lines between the components within high-voltage parts HT1 105 and HT2 106 are enclosed by the corresponding electrical insulation $IS2_{HT1}$ or $IS2_{HT2}$, respectively.

Figure 2:
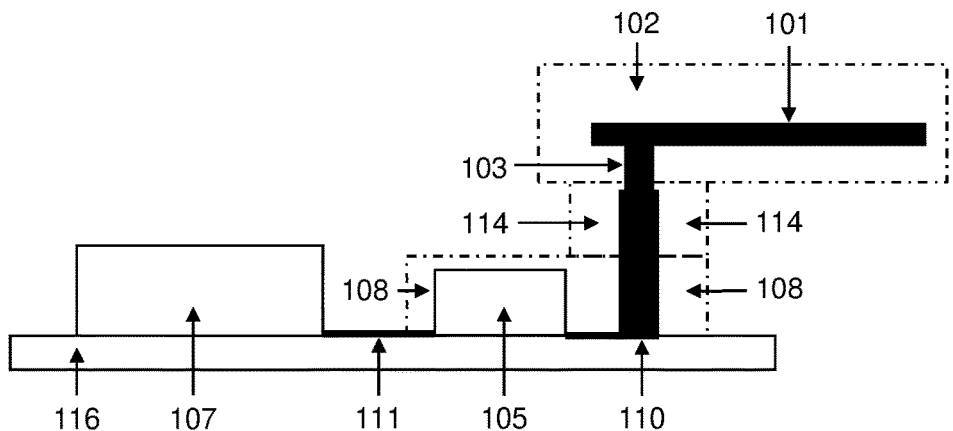
FIG. 2 shows a side view along an intersecting line A-A' of FIG. 1 with the main coil HS and plate 116 in a mounted state ready for operation.
Figure 3:
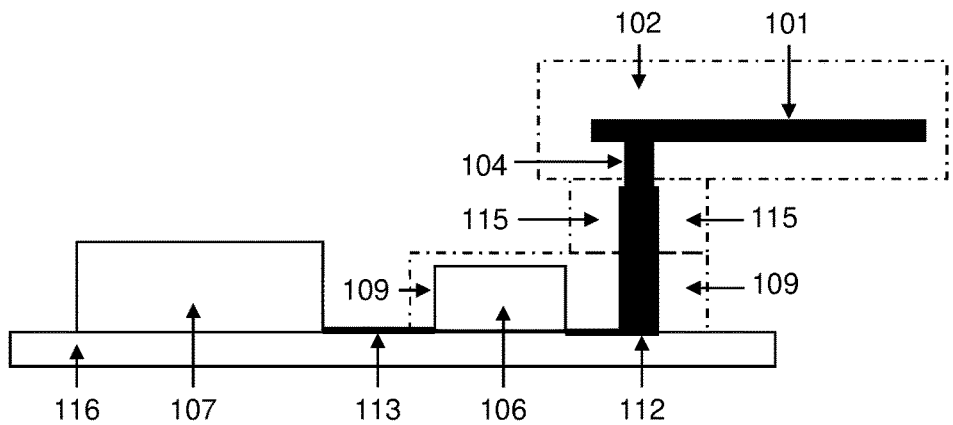
FIG. 3 shows a side view along an intersecting line B-B' of FIG. 1 with the main coil HS and plate 116 in a mounted state ready for operation.

According to the invention, connection $A1_{HS}$ 103 can only be electrically connected to connection $A1_{HT}$ 110 and connection $A2_{HS}$ 104 can only be electrically connected to connection $A2_{HT}$ 112 such that connections $A1_{HS}$-$A1_{HT}$, which are electrically connected to one another, are directly and completely enclosed by electrical insulation $IS3_{A1}$ 114, which is directly in contact with insulation IS1 102 and $IS2_{HT1}$ 108 as illustrated in FIG. 2, and connections $A2_{HS}$-$A2_{HT}$, which are electrically connected to one another, are directly and completely enclosed by electrical insulation $IS3_{A2}$ 115, which is directly in contact with insulation IS1 102 and $IS2_{HT2}$ 109 as illustrated in FIG. 3.

This is especially clear from FIG. 2, which shows a side view along an intersecting line A-A' of FIG. 1 with the main coil HS and electrical assembly in a mounted state ready for operation. In this case, the plug of connection $A1_{HS}$ 103 is electrically connected to the socket of connection $A1_{HT}$ 110, i.e., the plug 103 is inserted in the socket 110. Similarly, FIG. 3 shows a side view along an intersecting line B-B' of FIG. 1 with the main coil HS and electrical assembly in a mounted state ready for operation. In this case, the plug of connection $A2_{HS}$ 104 is electrically connected to the socket of connection $A2_{HT}$ 112, i.e., the plug 104 is inserted in the socket 112.

FIG. 2 clearly shows that all high-voltage-conducting components (main coil HS 101, plug-in connection: connections $A1_{HS}$-$A1_{HT}$ and high-voltage part HT1 105) and the surfaces surrounding them are completely enclosed by electrical insulation IS1 102, $IS2_{HT1}$ 108, and $IS3_{A1}$ 114 such that the problem of occurring creepage currents is significantly reduced and thus compact designs of the module can be implemented for inductive energy transfer. Similarly, FIG. 3 clearly shows that all high-voltage-conducting components (main coil HS 101, plug-in connection: connections $A2_{HS}$-$A2_{HT}$ and high-voltage part HT1 106) and the surfaces surrounding them are completely enclosed by electrical insulation IS1 102, $IS2_{HT2}$ 109, and $IS3_{A2}$ 115 such that the problem of occurring creepage currents is significantly reduced and thus compact designs of the module can be implemented for inductive energy transfer.

Although the invention has been illustrated and explained in more detail by preferred example embodiments, the invention is not limited by the disclosed examples and other variations may be derived by one of ordinary skill in the art without extending beyond the protective scope of the invention. It is thus clear that a plurality of variation options exist. It is likewise clear that example embodiments actually only represent examples, which are not to be interpreted in any manner as a limitation, for example, of the protective scope, the use options, or the configuration of the invention. Rather, the previous description and the description of figures should make one of ordinary skill in the art capable of specifically implementing the example embodiments, wherein one of ordinary skill in the art with knowledge of the disclosed concept of the invention can undertake various changes, for example with respect to the function or the arrangement of individual elements listed in an example embodiment, without going beyond the scope of protection, which is defined by the claims and the legal equivalents thereof such as, for example, more extensive explanations in the description.

LIST OF REFERENCE NUMERALS

101 Main coil HS
102 Insulation IS1
103 Connection $A1_{HS}$ from/to the main coil HS
104 Connection $A2_{HS}$ from/to the main coil HS
105 High-voltage part HT1
106 High-voltage part HT2
107 Low-voltage part NT
108 Electrical insulation $IS2_{HT1}$
109 Electrical insulation $IS2_{HT2}$
110 Connection $A1_{HT}$
111 Electrical supply line
112 Connection $A2_{HT}$ 113 Electrical supply line
114 Electrical insulation $IS3_{A1}$
115 Electrical insulation $IS3_{A2}$
116 Electrically insulating plate

The invention claimed is:

1. A module for inductive energy transfer, the module comprising:
a main coil HS completely enclosed by an electrical insulation IS1, wherein only an electrical connection $A1_{HS}$ and an electrical connection $A2_{HS}$ are routed from/to the main coil HS, by the electrical insulation IS1; and
an electrical assembly with a high-voltage part HT1, a high-voltage part HT2, and a low-voltage part NT, wherein the high-voltage part HT1 is directly and completely enclosed by an electrical insulation $IS2_{HT1}$ and the high-voltage HT2 is directly and completely enclosed by an electrical insulation $IS2_{HT2}$ that is separate from the electrical insulation $IS2_{HT1}$, wherein an electrical connection $A1_{HT}$ is routed to a first electrical connection of the main coil HS, and a first electrical supply line is routed from the low-voltage part NT to the high-voltage part HT1 by the electrical insulation $IS2_{HT1}$, and wherein an electrical connection $A2_{HT}$ is routed to a second electrical connection of the main coil HS, and a second electrical supply line is routed from the low-voltage part NT to the high-voltage part HT2 by the electrical insulation $IS2_{HT2}$,
wherein the electrical connection $A1_{HS}$ is electrically connectable only to the electrical connection $A1_{HT}$ such that electrical connections $A1_{HS}$-$A1_{HT}$, which are electrically connected to one another, are directly and completely enclosed by an electrical insulation $IS3_{A1}$, the electrical insulation $IS3_{A1}$ is directly in contact with the electrical insulation IS1 and the electrical insulation $IS2_{HT1}$, and
wherein the electrical connection $A2_{HS}$ is electrically connectable only to the electrical connection $A2_{HT}$ such that electrical connections $A2_{HS}$-$A2_{HT}$, which are electrically connected to one another, are directly and completely enclosed by an electrical insulation $IS3_{A2}$, the electrical insulation $IS3_{A2}$ is directly in contact with the electrical insulation IS1 and the electrical insulation $IS2_{HT2}$.

2. The module according to claim 1, wherein the electrical insulation IS1 is formed as a housing comprising an electrically insulating material, in which windings of the main coil HS are routed.

3. The module according to claim 1, wherein one or more of the electrical insulation IS1, the electrical insulation $IS2_{HT1}$, the electrical insulation $IS2_{HT2}$, the electrical insulation $IS3_{A1}$, or the electrical insulation $IS3_{A2}$ are formed from an identical electrically insulating material.

4. The module according to claim 1, wherein each of the high-voltage part HT1 and the high-voltage part HT2 comprises an array of capacitors, coils, or capacitors and coils.

5. The module according to claim 1, wherein each of the high-voltage part HT1 and the high-voltage part HT2 includes electrical components arranged such that a voltage generated or processed by the electrical components increases in one direction via the high-voltage part HT1, the high-voltage part HT2, or the high-voltage part HT1 and the high-voltage part HT2.

6. The module according to claim 5, wherein the one direction of increase of the voltage extends over the high-voltage part HT1 essentially from a position of an inlet of the first electrical supply line from the low-voltage part NT to a position of the electrical connection $A1_{HT}$, or extends over the high-voltage part HT2 essentially from a position of an inlet of the second electrical supply line from the low-voltage part NT to a position of the electrical connection $A2_{HT}$.

7. A ground module GPM of a vehicle charging system for charging an energy storage device on the vehicle, wherein the vehicle charging system comprises the ground module GPM and a vehicle module CPM, the vehicle module CPM arranged on the vehicle, wherein energy from the ground module GPM is transferred inductively to the vehicle module CPM, wherein the ground module GPM comprises:
a main coil HS completely enclosed by an electrical insulation IS1, wherein only an electrical connection Alms and an electrical connection $A2_{HS}$ are routed from/to the main coil HS, by the electrical insulation IS1; and
an electrical assembly with a high-voltage part HT1, a high-voltage part HT2, and a low-voltage part NT, wherein the high-voltage part HT1 is directly and completely enclosed by an electrical insulation $IS2_{HT1}$ and the high-voltage part HT2 is directly and completely enclosed by an electrical insulation $IS2_{HT2}$ that is separate from the electrical insulation $IS2_{HT1}$, wherein an electrical connection $A1_{HT}$ is routed to a first electrical connection of the main coil HS, and a first electrical supply line is routed from the low-voltage part NT to the high-voltage part HT1 by the electrical insulation $IS2_{HT1}$, and wherein an electrical connection $A2_{HT}$ is routed to a second electrical connection of the main coil HS, and a second electrical supply line is routed from the low-voltage part NT to the high-voltage part HT2 by the electrical insulation $IS2_{HT2}$,
wherein the electrical connection $A1_{HS}$ is electrically connectable only to the electrical connection $A1_{HT}$ such that electrical connections $A1_{HS}$-$A1_{HT}$, which are electrically connected to one another, are directly and completely enclosed by an electrical insulation $IS3_{A1}$, the electrical insulation $IS3_{A1}$ is directly in contact with the electrical insulation IS1 and the electrical insulation $IS2_{HT1}$, and
wherein the electrical connection $A2_{HS}$ is electrically connectable only to the electrical connection $A2_{HT}$ such that electrical connections $A2_{HS}$-$A2_{HT}$, which are electrically connected to one another, are directly and completely enclosed by an electrical insulation $IS3_{A2}$, the electrical insulation $IS3_{A2}$ is directly in contact with the electrical insulation IS1 and the electrical insulation $IS2_{HT2}$.

8. The ground module GPM according to claim 7, wherein the electrical insulation IS1 is formed as a housing comprising an electrically insulating material, in which windings of the main coil HS are routed.

9. The ground module GPM according to claim 7, wherein one or more of the electrical insulation IS1, the electrical insulation $IS2_{HT1}$, the electrical insulation $IS2_{HT2}$, the electrical insulation $IS3_{A1}$, or the electrical insulation $IS3_{A2}$ are formed from an identical electrically insulating material.

10. The ground module GPM according to claim 7, wherein each of the high-voltage part HT1 and the high-voltage part HT2 comprises an array of capacitors, coils, or capacitors and coils.

11. The ground module GPM according to claim 7, wherein each of the high-voltage part HT1 and the high-voltage part HT2 includes electrical components arranged such that a voltage generated or processed by the electrical components increases in one direction via the high-voltage part HT1, the high-voltage part HT2, or the high-voltage part HT1 and the high-voltage part HT2.

12. The ground module GPM according to claim 11, wherein the one direction of increase of the voltage extends over the high-voltage part HT1 essentially from a position of an inlet of the first electrical supply line from the low-voltage part NT to a position of the electrical connection $A1_{HT}$, and extends over the high-voltage part HT2 essentially from a position of an inlet of the second electrical supply line from the low-voltage part NT to a position of the electrical connection $A2_{HT}$.

13. A vehicle module CPM of a vehicle charging system for charging an energy storage device on the vehicle, wherein the vehicle charging system comprises a ground module GPM and the vehicle module CPM, the vehicle module CPM arranged on the vehicle, wherein energy from the ground module GPM is transferred inductively to the vehicle module CPM, wherein the vehicle module CPM comprises:
   a main coil HS completely enclosed by an electrical insulation IS1, wherein only an electrical connection $A1_{HS}$ and an electrical connection $A2_{HS}$ are routed from/to the main coil HS, by the electrical insulation IS1; and
   an electrical assembly with a high-voltage part HT1, a high-voltage part HT2, and a low-voltage part NT, wherein the high-voltage part HT1 is directly and completely enclosed by an electrical insulation $IS2_{HT1}$ and the high-voltage part HT2 is directly and completely enclosed by an electrical insulation $IS2_{HT2}$ that is separate from the electrical insulation $IS2_{HT1}$, wherein an electrical connection $A1_{HT}$ is routed to a first electrical connection of the main coil HS, and a first electrical supply line is routed from the low-voltage part NT to the high-voltage part HT1 by the electrical insulation $IS2_{HT1}$, and wherein an electrical connection $A2_{HT}$ is routed to a second electrical connection of the main coil HS, and a second electrical supply line is routed from the low-voltage part NT to the high-voltage part HT2 by the electrical insulation $IS2_{HT2}$,
   wherein the electrical connection $A1_{HS}$ is electrically connectable only to the electrical connection $A1_{HT}$ such that electrical connections $A1_{HS}$-$A1_{HT}$, which are electrically connected to one another, are directly and completely enclosed by an electrical insulation $IS3_{A1}$, the electrical insulation $IS3_{A1}$ is directly in contact with the electrical insulation IS1 and the electrical insulation $IS2_{HT1}$, and
   wherein the electrical connection $A2_{HS}$ is electrically connectable only to the electrical connection $A2_{HT}$ such that electrical connections $A2_{HS}$-$A2_{HT}$, which are electrically connected to one another, are directly and completely enclosed by an electrical insulation $IS3_{A2}$, the electrical insulation $IS3_{A2}$ is directly in contact with the electrical insulation IS1 and the electrical insulation $IS2_{HT2}$.

14. The vehicle module CPM according to claim 13, wherein the electrical insulation IS1 is formed as a housing comprising an electrically insulating material, in which windings of the main coil HS are routed.

15. The vehicle module CPM according to claim 13, wherein one or more of the electrical insulation IS1, the electrical insulation $IS2_{HT1}$, the electrical insulation $IS2_{HT2}$, the electrical insulation $IS3_{A1}$, or the electrical insulation $IS3_{A2}$ are formed from an identical electrically insulating material.

16. The vehicle module CPM according to claim 13, wherein each of the high-voltage part HT1 and the high-voltage part HT2 comprises an array of capacitors, coils, or capacitors and coils.

17. The vehicle module CPM according to claim 13, wherein each of the high-voltage part HT1 and the high-voltage part HT2 includes electrical components arranged such that a voltage generated or processed by the electrical components increases in one direction via the high-voltage part HT1, the high-voltage part HT2, or high-voltage part HT1 and the high-voltage part HT2.

18. The vehicle module CPM according to claim 17, wherein the one direction of increase of the voltage extends over the high-voltage part HT1 essentially from a position of an inlet of the first electrical supply line from the low-voltage part NT to a position of the electrical connection $A1_{HT}$, and extends over the high-voltage part HT2 essentially from a position of an inlet of the second electrical supply line from the low-voltage part NT to a position of the electrical connection $A2_{HT}$.

19. A charging system of a vehicle for charging of an energy storage device on the vehicle, the charging system comprising a ground module GPM and a vehicle module CPM, the vehicle module CPM arranged on the vehicle, wherein energy from the ground module GPM is transferred inductively to the vehicle module CPM, wherein the ground module GPM or the vehicle module CPM has, or the ground module GPM and the vehicle module CPM have a module comprising:
   a main coil HS completely enclosed by an electrical insulation IS1, wherein only an electrical connection $A1_{HS}$ and an electrical connection $A2_{HS}$ are routed from/to the main coil HS, by the electrical insulation IS1; and
   an electrical assembly with a high-voltage part HT1, a high-voltage part HT2, and a low-voltage part NT, wherein the high-voltage part HT1 is directly and completely enclosed by an electrical insulation $IS2_{HT1}$ and the high-voltage part HT2 is directly and completely enclosed by an electrical insulation $IS2_{HT2}$ that is separate from the electrical insulation $IS2_{HT1}$, wherein an electrical connection $A1_{HT}$ is routed to a first electrical connection of the main coil HS, and a first electrical supply line is routed from the low-voltage part NT to the high-voltage part HT1 by the electrical insulation $IS2_{HT1}$, and wherein an electrical connection $A2_{HT}$ is routed to a second electrical connection of the main coil HS, and a second electrical supply line is routed from the low-voltage part NT to the high-voltage part HT2 by the electrical insulation $IS2_{HT2}$,
   wherein the electrical connection $A1_{HS}$ is electrically connectable only to the electrical connection $A1_{HT}$ such that electrical connections $A1_{HS}$-$A1_{HT}$, which are electrically connected to one another, are directly and completely enclosed by an electrical insulation $IS3_{A1}$, the electrical insulation $IS3_{A1}$ is directly in contact with the electrical insulation IS1 and the electrical insulation $IS2_{HT1}$, and
   wherein the electrical connection $A2_{HS}$ is electrically connectable only to the electrical connection $A2_{HT}$ such that electrical connections $A2_{HS}$-$A2_{HT}$, which are electrically connected to one another, are directly and completely enclosed by an electrical insulation $IS3_{A2}$, the electrical insulation $IS3_{A2}$ is directly in contact with the electrical insulation IS1 and the electrical insulation $IS2_{HT2}$.

20. A vehicle comprising a module for inductive energy transfer, the module comprising:
- a main coil HS completely enclosed by an electrical insulation IS1, wherein only an electrical connection $A1_{HS}$ and an electrical connection $A2_{HS}$ are routed from/to the main coil HS, by the electrical insulation IS1; and
- an electrical assembly with a high-voltage part HT1, a high-voltage part HT2, and a low-voltage part NT, wherein the high-voltage part HT1 is directly and completely enclosed by an electrical insulation $IS2_{HT1}$ and the high-voltage part HT2 is directly and completely enclosed by an electrical insulation $IS2_{HT2}$ that is separate from the electrical insulation $IS2_{HT1}$, wherein an electrical connection $A1_{HT}$ is routed to a first electrical connection of the main coil HS, and a first electrical supply line is routed from the low-voltage part NT to the high-voltage part HT1 by the electrical insulation $IS2_{HT1}$, and wherein an electrical connection $A2_{HT}$ is routed to a second electrical connection of the main coil HS, and a second electrical supply line is routed from the low-voltage part NT to the high-voltage part HT2 by the electrical insulation $IS2_{HT2}$, wherein the electrical connection $A1_{HS}$ is electrically connectable only to the electrical connection $A1_{HT}$ such that electrical connections $A1_{HS}$-$A1_{HT}$, which are electrically connected to one another, are directly and completely enclosed by an electrical insulation $IS3_{A1}$, the electrical insulation $IS3_{A1}$ is directly in contact with the electrical insulation IS1 and the electrical insulation $IS2_{HT1}$, and wherein the electrical connection $A2_{HS}$ is electrically connectable only to the electrical connection $A2_{HT}$ such that electrical connections $A2_{HS}$-$A2_{HT}$, which are electrically connected to one another, are directly and completely enclosed by an electrical insulation $IS3_{A2}$, the electrical insulation $IS3_{A2}$ is directly in contact with the electrical insulation IS1 and the electrical insulation $IS2_{HT2}$.

21. The vehicle according to claim 20, wherein the vehicle is a land-based vehicle, aircraft, watercraft, or railway vehicle.

* * * * *